J. R. GAMMETER
Oct. 18, 1932. METHOD AND APPARATUS FOR MAKING THREAD RUBBER Re. 18,625
Original Filed May 1, 1928
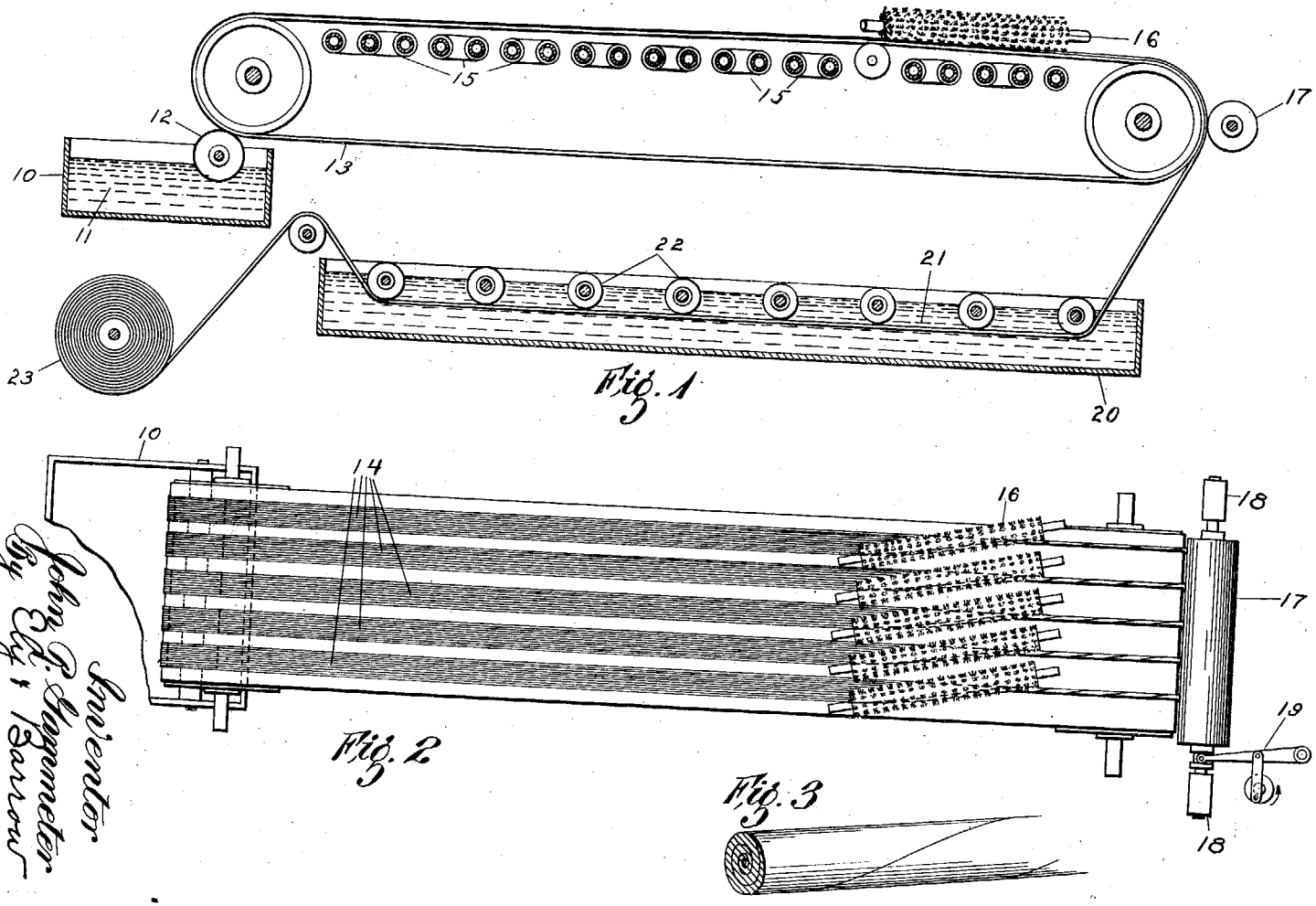
Inventor
John R. Gammeter
By Ely & Barrow
Attys.

Reissued Oct. 18, 1932

Re. 18,625

UNITED STATES PATENT OFFICE

JOHN R. GAMMETER, OF AKRON, OHIO

METHOD AND APPARATUS FOR MAKING THREAD RUBBER

Original No. 1,846,253, dated February 23, 1932, Serial No. 274,230, filed May 1, 1928. Application for reissue filed July 15, 1932. Serial No. 622,777.

This invention relates to thread rubber such as used in golf balls, elastic fabrics, etc., and to procedure and apparatus for making the same.

The general purpose of the invention is to provide an improved thread rubber uniformly circular in cross-section and having a smooth, knot-free surface, and to provide improved procedure and apparatus for quickly and inexpensively producing such thread.

One object of the invention is to provide a method for making such thread in a continuous manner, including depositing a continuous layer of rubber on a traveling surface and progressively rolling the layer upon itself from one side to the other to circular form, the layer being thus wound into helical convolutions.

Another object is to provide in conjunction with the above method, the step of depositioning a rubber material from solution, preferably a natural or artificial dispersion of rubber in water, as a layer on a traveling surface, and for drying the layer to tacky condition for effective rolling of the material into thread form.

A further object is to provide in conjunction with the thread forming method, the method of compacting the thread material.

A further object is to provide in conjunction with the method of forming the thread material the step of vulcanizing such thread material.

A further object is to provide apparatus for carrying out the method or steps thereof set forth above.

The method heretofore usually practiced for making thread rubber has been to start with crude or coagulated rubber, mill it with the usual compounding ingredients, calender it to sheet form, vulcanizing the sheet and cutting the sheet into threads. This method is expensive and entails the use of heavy, expensive machinery occupying considerable floor space and requiring a large amount of power for operation thereof. The resulting thread is square in cross-section and is weak as compared with thread of the present invention, due to the "nerve or fibre" of the rubber being affected by the masticating operations and due to weak spots or sections in the thread occurring as a result of blisters, etc., formed in the sheet when calendered.

The thread and method and apparatus of the present invention are illustrated in the accompanying drawing and more particularly described below. It is to be understood that the invention is not limited to the particular form thereof shown and described.

Of the accompanying drawing,

Figure 1 is an elevation more or less diagrammatically illustrating an apparatus and a method embodying and carrying out the invention;

Figure 2 is a plan thereof; and

Figure 3 is a perspective of a section of the improved thread.

Referring to the drawing, the numeral 10 designates a tank for a rubber solution 11, preferably a dispersion of rubber in water such as natural latex or artificial dispersions of crude or vulcanizer rubber or mixtures thereof and containing dispersed therein vulcanizing reagents such as sulphur and also any of the usual compounding ingredients.

Journaled in tank 10 are one or more rollers 12, 12, partly submerged in the solution 11 and adapted to pick a film of solution up and deposit it on a traveling surface such as may be provided by belt 13 in contact with the exposed faces of rollers 12. The surface on which the rubber is deposited is smooth and clean so that the rubber will not adhere thereto. The deposited films or layers of latex shown at 14, 14 and due to natural flow, the edges of each strip are tapered or feathered.

After the rubber is deposited on the traveling surface 13, it is dried to tacky condition, heating coils 15, 15 being shown under the belt 13 for this purpose, and while still tacky, it is progressively rolled up on itself from one edge of each strip to the other. Suitable rotary elements such as brushes 16, 16 may be provided for this purpose, the brushes being arranged transversely of the belt at an angle to the strips as shown, whereby the strips are first engaged by the brush at one edge and the wiping action of the brushes serving to roll the material upon itself, in effect, progresses angularly across the strip as the strip is traveling. The surface 13 and the brushes 16 may diverge slightly as shown so that the building of the rubber upon itself is compensated for and so that tearing of the rubber or picking up of rubber by the brushes will be prevented.

The rolling of the rubber material upon itself in this manner permits the continuous formation of the desired thread by rolling it into what may be termed helical convolutions, the edge of the strip on the outside of the thread following a helical path on the surface of the thread as appears in Figures 2 and 3.

The resulting thread is preferably compacted before vulcanization and this may be accomplished by rolling it transversely to and fro between surface 13 and a rotary rubber roller 17, which latter may be mounted for endwise motion to and fro on bearings 18, 18 and may be so actuated by an eccentric and crank mechanism 19.

The formed threads may be subsequently vulcanized, which operation can be performed by passing them continuously from the forming apparatus into suitable vulcanizing apparatus. For example, they may be passed into tank 20 containing boiling water 21, being depressed under the surface of the water by rollers 22, 22 journaled in said tank. The thread issuing from tank 20 may then be reeled as indicated at 23.

The resulting thread is smooth, uniform in section, and has high tensile strength rendering it very effective for use in golf balls, elastic fabrics and for other purposes. Obviously a thread of any desired dimensions may be secured by starting with films of rubber of varying widths and thicknesses.

Modifications of the invention may be resorted to without departing from the spirit thereof or the scope of the appended claims.

What is claimed is:

1. That method for making thread rubber which comprises applying a film of rubber to a traveling surface, drying the rubber to a tacky condition, progressively brushing said rubber angularly across the film from one edge thereof to the other to roll it upon itself in helical convolutions, compacting the rubber thread thus produced by rolling it both longitudinally and also transversely to and fro on said surface, and passing the compacted thread through a curing medium to vulcanize it.

2. That method for making thread rubber which comprises applying a film of vulcanizable rubber in water dispersion to a traveling surface, drying the rubber to a tacky condition, progressively rolling the rubber upon itself angularly from one edge across the film into helical convolutions, compacting the rubber thread thus produced by rolling it both longitudinally and also transversely to and fro on said surface, and passing the compacted thread through a curing medium to vulcanize it.

3. That method for making thread rubber which comprises applying a film of rubber to a traveling surface, drying the rubber to a tacky condition, progressively brushing said rubber angularly across the film from one edge thereof to the other to roll it upon itself in helical convolutions, compacting the rubber thread thus produced, and passing the compacted thread through a curing medium to vulcanize it.

4. That method for making thread rubber which comprises applying a film of rubber to a traveling surface, drying the rubber to a tacky condition, progressively rolling the rubber upon itself angularly from one edge across the film into helical convolutions, and compacting the rubber thread thus produced by rolling it both longitudinally and also transversely to and fro on said surface.

5. That method for making thread rubber which comprises applying a film of rubber in water dispersion to a traveling surface, drying the rubber to a tacky condition, progressively brushing said rubber angularly across the film from one edge thereof to the other to roll it upon itself in helical convolutions, and compacting the rubber thread thus produced.

6. That method for making thread rubber which comprises applying a film of rubber in water dispersion to a traveling surface, drying the rubber to a tacky condition, progressively rolling the rubber upon itself angularly from one edge across the film into helical convolutions, and compacting the rubber thread.

7. That method for making thread rubber which comprises applying a film of rubber to a traveling surface, drying the rubber to a tacky condition, progressively rolling the rubber upon itself angularly from one edge across the film into helical convolutions, and compacting the rubber thread.

8. That method for making thread rubber comprising forming a film of rubber in solution whereby the edges of the film are feathered, progressively rolling said rubber upon itself angularly from one edge to the other, and compacting the thread thus formed.

9. That method for making thread rubber comprising forming a film of rubber in solution whereby the edges of the film are feathered, and progressively rolling said rubber upon itself angularly from one edge to the other.

10. The method of manufacturing rubber thread, which comprises continuously depositing a film from a dispersion of rubber upon a drying surface, and rolling the film into a thread.

11. The method of manufacturing rubber thread, which comprises depositing a film of a rubber dispersion upon an advancing drying surface, and rolling the advancing film into a thread.

12. The method of manufacturing rubber thread, which comprises depositing a film of a rubber dispersion upon an advancing drying surface, and brushing the advancing film into a thread.

13. The method of making rubber thread, which comprises continuously forming rubber in a liquid condition into a strip of substantially solid rubber containing material, and transforming the strip into a thread.

14. The method of making rubber thread, which comprises continuously depositing a film from a dispersion of rubber upon a drying surface and consolidating the film transversely of its length into a thread.

15. The method of manufacturing rubber thread, which comprises depositing a film from a dispersion of rubber upon a continuously advancing surface, and consolidating the film transversely of its length into a thread.

16. The method of manufacturing rubber thread, which comprises forming a plurality of continuous strips from a rubber dispersion, and consolidating the strips transversely of their lengths into a plurality of threads.

17. Apparatus for making thread rubber comprising a traveling element, means for applying a film of rubber in solution thereon, means for drying the rubber thereon, a rotary element arranged at an angle across said traveling element to wipe thereon progressively from one edge of the film to the other to roll the film upon itself into helical convolutions, and means for compacting the thread thus formed.

18. Apparatus for making thread rubber comprising a traveling element, means for applying a film of rubber thereon, a rotary element arranged at an angle across said traveling element to wipe thereon progressively from one edge of the film to the other to roll the film upon itself into helical convolutions, a roller operable on the thread rubber thus formed on the traveling element to compact the thread, and means for axially moving the roller to and fro transversely of the traveling element.

19. Apparatus for making rubber thread comprising a traveling element, means for applying a film of rubber in solution thereon, means for drying the rubber film on the element, means for rolling the rubber film upon itself on the element to form a thread, means for compacting the thread, and means for vulcanizing the thread as it passes from the traveling element.

20. Apparatus for making rubber thread comprising a traveling element, means for applying a film of rubber thereon, means for rolling the rubber film upon itself on the element to form a thread, and means for vulcanizing the thread as it passes from the traveling element.

21. Apparatus for use in compacting continuous strand material of round cross-section comprising a traveling element for conveying the material, a roller operable on the material on said element, and means for axially moving the roller to and fro transversely of the element.

22. In combination, a drier having a continuously advancing surface, means for applying a film of a rubber dispersion to said surface, and means adapted to engage and roll the advancing end of the film into a continuous thread.

23. In combination, a drier having a continuously advancing surface, means for applying a film of a rubber dispersion to said surface, and a rotating brush engaging said film obliquely to its direction of advance.

Signed at New York, county of New York, and State of New York, this 14th day of July, 1932.

JOHN R. GAMMETER.